US012790174B2

(12) United States Patent
Sirigu

(10) Patent No.: US 12,790,174 B2
(45) Date of Patent: Nov. 10, 2026

(54) GUARDRAIL SYSTEM

(71) Applicant: Otis Elevator Company, Farmington, CT (US)

(72) Inventor: Gerard Sirigu, Gien (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 1035 days.

(21) Appl. No.: 17/985,640

(22) Filed: Nov. 11, 2022

(65) Prior Publication Data

US 2024/0067496 A1 Feb. 29, 2024

(30) Foreign Application Priority Data

Aug. 25, 2022 (EP) .................................... 22306259

(51) Int. Cl.
*B66B 5/28* (2006.01)
*B66B 5/00* (2006.01)

(52) U.S. Cl.
CPC .......... *B66B 5/0062* (2013.01); *B66B 5/0081* (2013.01)

(58) Field of Classification Search
CPC ............................ B66B 5/0062; B66B 5/0081
USPC .......................................................... 187/393
See application file for complete search history.

(56) References Cited

U.S. PATENT DOCUMENTS

| | | | | |
|---|---|---|---|---|
| 6,446,760 B1 * | 9/2002 | Lisi | B66B 13/22 187/391 |
| 11,772,933 B2 * | 10/2023 | Bütler | B66B 1/3484 187/375 |
| 2021/0371241 A1 * | 12/2021 | Talonen | B66B 5/0031 |
| 2022/0106163 A1 * | 4/2022 | Aitamurto | B66B 5/0031 |

FOREIGN PATENT DOCUMENTS

| | | | |
|---|---|---|---|
| JP | S5142241 A | 4/1976 | |
| JP | 2011126706 A | 6/2011 | |
| WO | WO-2021121904 A1 * | 6/2021 | B66B 5/0081 |

OTHER PUBLICATIONS

European Search Report for application EP 22306259.7, dated Jan. 30, 2023, 63 pages.

* cited by examiner

*Primary Examiner* — Erick D Glass
(74) *Attorney, Agent, or Firm* — CANTOR COLBURN LLP

(57) ABSTRACT

An elevator car (102) including at least one barrier (110) extending from an external surface (106, 108) of the elevator car (102). The elevator car (102) further includes a switch (208) connectable in series with a safety chain circuit. The at least one barrier (110) is configured to be displaced from a first position (202) to a second position (204) upon contact with an object (120), such that the displacement to the second position (204) opens the switch (208) to initiate an emergency stop procedure of the elevator car (102).

14 Claims, 5 Drawing Sheets

GUARDRAIL SYSTEM

FOREIGN PRIORITY

This application claims priority to European Patent Application No. 22306259.7, filed Aug. 25, 2022, and all the benefits accruing therefrom under 35 U.S.C. § 119, the contents of which in its entirety are herein incorporated by reference.

TECHNICAL FIELD

This disclosure relates to an elevator car guardrail system for an elevator car, an elevator car, and an elevator system.

BACKGROUND

Maintenance procedures for elevator systems often involve maintenance personnel accessing the hoistway of the elevator system and carrying out maintenance procedures in the hoistway pit or from the top of the elevator car.

Accidents and injury to maintenance personnel have been known to occur during such maintenance procedures. These may be caused when the maintenance personnel is positioned in the pathway of the elevator car. For example, if the elevator car is placed into normal operation mode before the maintenance procedure has been completed, the moving elevator car may contact or strike the maintenance personnel. Alternatively, the maintenance personnel may be positioned on top of the elevator car, and may extend a body part, for example their arm, beyond the elevator car perimeter whilst the elevator car is moving, which may result in the body part becoming caught in the hoistway.

The present disclosure seeks to address at least some of the drawbacks described above.

SUMMARY

According to a first aspect of this disclosure there is provided an elevator car comprising: at least one barrier extending from an external surface of the elevator car; and a switch connectable in series with a safety chain circuit; wherein the at least one barrier is configured to be displaced from a first position to a second position upon contact with an object, such that the displacement to the second position opens the switch to initiate an emergency stop procedure of the elevator car.

The at least one barrier may be configured to extend a predetermined distance from the external surface of the elevator car, wherein the predetermined distance includes a designated height of a safety space and an additional height which corresponds to a stopping distance of the elevator car during the emergency stop procedure. The predetermined distance may be at least 0.8 m, 0.9 m, 1.0 m, 1.1 m, 1.2 m, 1.3 m, 1.4 m or 1.5 m, for example. This predetermined distance may therefore include both the designated minimum height of a safety space above/below the elevator car, where maintenance personnel can crouch to avoid being crushed, and an additional distance corresponding to a stopping distance of the elevator car during the emergency stop procedure. The additional height corresponds to a minimum stopping distance and may exceed the expected stopping distance, for instance including a safety margin.

The at least one barrier may comprise a flexible portion configured to flex upon contact with an object. The flexible portion may comprise polycarbonate, or other suitable material. The flexible portion can help to absorb an impact.

The at least one barrier may further comprise a rigid portion extending substantially perpendicular from the external surface of the elevator car. The flexible portion may extend from the rigid portion and may be configured to be displaced relative to the rigid portion. The flexible portion may be configured to flex and/or rotate relative to the rigid portion to thereby move to the second position upon contact with an object.

The flexible portion may be configured to extend from the rigid portion by an additional distance corresponding to a stopping distance of the elevator car during the emergency stop procedure. This means that deflection of the flexible portion triggers the safety brake to bring the elevator car to a stop before there is an impact with the rigid portion that designates the safety space above/below the elevator car.

The rigid portion may be configured to extend to a designated height of a safety space, for example a designated height that is at least 0.5 m, 0.6 m, or 0.7 m from the external surface of the elevator car. This designated height may be a minimum height designated for a safety space above/below the elevator car where maintenance personnel can crouch to avoid being crushed.

At least a portion of the at least one barrier (e.g. the rigid portion, e.g. the flexible portion) may be configured to rotate between the first position and the second position. An angle of rotation between the first position and the second position may be at least 3 degrees, preferably at least 4 degrees or 5 degrees.

The at least a portion of the at least one barrier may be configured to rotate beyond the second position, for example to rotate through a total angle of up to 80 degrees, or up to 85 degrees, or up to 86 degrees, or substantially up to 90 degrees. This means that, after rotation of the at least a portion of the at least one barrier to the second position opens the switch, there is continued rotation until a further position at or close to horizontal is reached.

The at least a portion of the at least one barrier may be a flexible portion configured to flex under an applied force after rotating to the second position.

An axis of rotation of said at least a portion of the at least one barrier may be between the at least one barrier and the external surface of the elevator car.

The at least one barrier may comprise a barrier extending from an external lower surface of the elevator car.

The barrier extending from the lower surface of the elevator car may be flexible and may be configured to flex and/or rotate between the first position and the second position upon contact with an object to thereby open the switch.

The at least one barrier may comprise a barrier extending from an external upper surface of the elevator car.

The switch may comprise a latching contact configured to latch open and maintain the open position when the at least one barrier is displaced to the second position.

The switch may be configured to be manually reset to a closed position.

According to a second aspect of the disclosure, there is provided an elevator car guardrail system for an elevator car, the guardrail system comprising: at least one barrier configured to extend from an external surface of an elevator car; at least one switch connectable in series with a safety chain circuit; wherein the at least one barrier is configured to be displaced from a first position to a second position upon contact with an object, such that the displacement to the second position opens the switch to initiate an emergency stop procedure of the elevator car.

According to a third aspect of the disclosure, there is provided an elevator system comprising: an elevator car; a safety system comprising an elevator brake and a safety chain circuit; at least one barrier extending from an external surface of the elevator car; and at least one switch connected in series with the safety chain circuit; wherein the at least one barrier is configured to be displaced from a first position to a second position upon contact with an object, such that the displacement to the second position opens the switch to apply the elevator brake, thereby initiating an emergency stop procedure of the elevator car.

It will be appreciated that any of the optional features described above in relation to the first aspect of the disclosure may equally be combined with the second or third aspects of the disclosure.

The examples described herein advantageously provide an elevator system with improved safety features, particularly for maintenance personnel carrying out maintenance procedures.

Some examples described herein advantageously provide a barrier, which acts as a first point of contact with maintenance personnel and initiates the emergency brake procedure of the elevator car to thereby prevent or reduce the impact of the elevator car with the maintenance personnel. As such, risk of serious injury to maintenance personnel is reduced.

DRAWING DESCRIPTION

Some examples of this disclosure will now be described, by way of example only, with reference to the accompanying drawings, in which.

In the drawings, like reference numerals refer to like parts.

DETAILED DESCRIPTION

Figure 1:
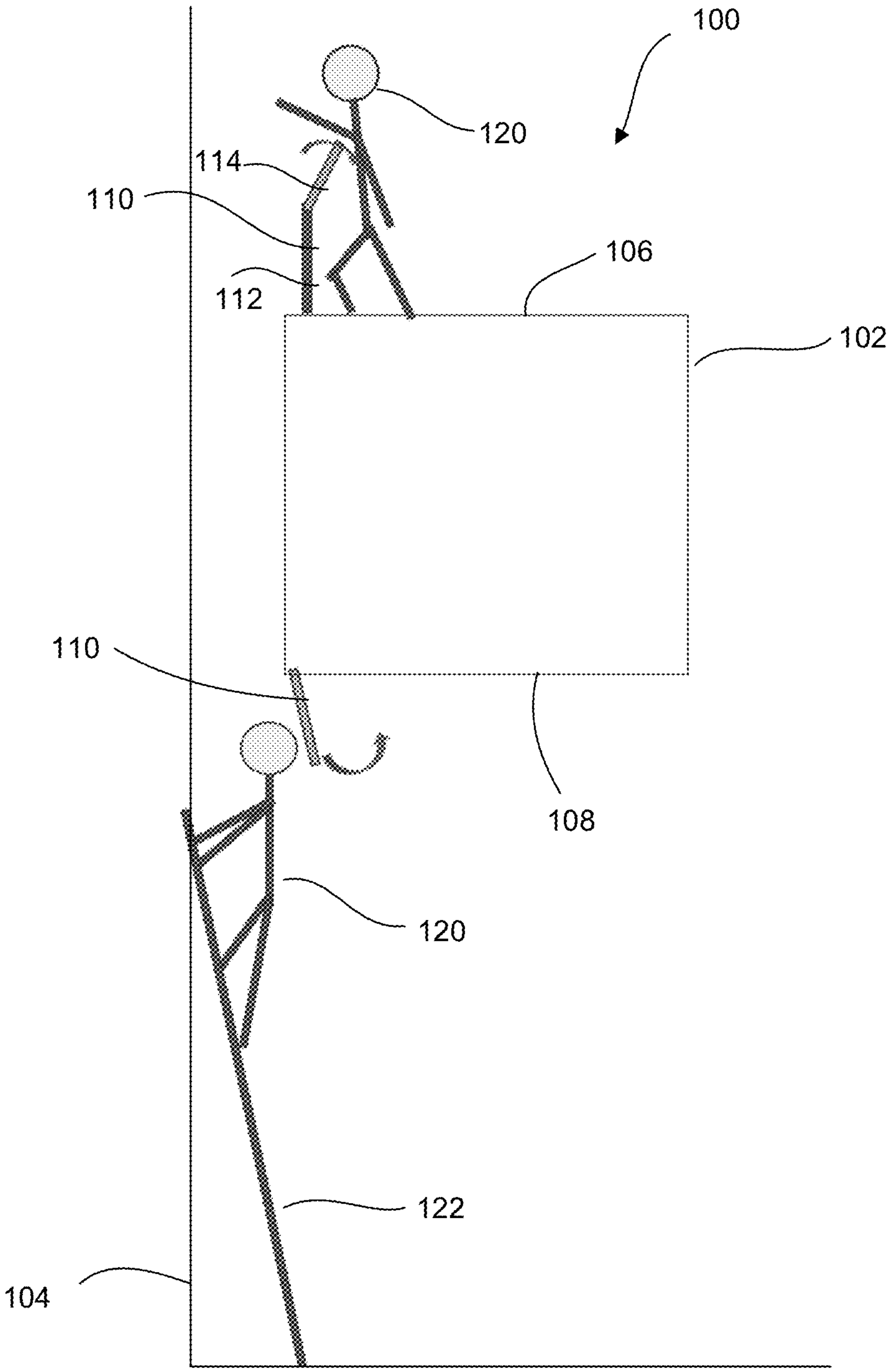
FIG. 1 shows a schematic view of an elevator system.

FIG. 1 shows an elevator system 100 including an elevator car 102 configured to move up and down within a hoistway 104. Various components of the elevator system 100 have been omitted for clarity, but it will be appreciated that the elevator system 100 may include other standard components including but not limited to a drive means, a tension member, a counterweight, and a plurality of elevator landing doors.

During a maintenance procedure, maintenance personnel 120 may perform maintenance operations at various positions within the hoistway 104. In a first position, the maintenance personnel 120 may stand on an external upper surface 106 of the elevator car 102. From here, the maintenance personnel 120 may perform maintenance procedures on top of the elevator car 102, or at desired locations in the hoistway 104 by reaching beyond or above the elevator car 102. In a second position, the maintenance personnel 120 may be positioned in the pit of the hoistway 104, beneath the elevator car 102. In this position, they may carry out maintenance procedures in the pit of the hoistway 104, or they may utilise a ladder 122 to reach higher areas of the hoistway 104.

To help protect the maintenance personnel 120 from injury, the elevator car 102 includes a barrier 110 extending from the external upper surface 106 and a barrier 110' extending from the external lower surface 108 of the elevator car 102.

Figure 2:
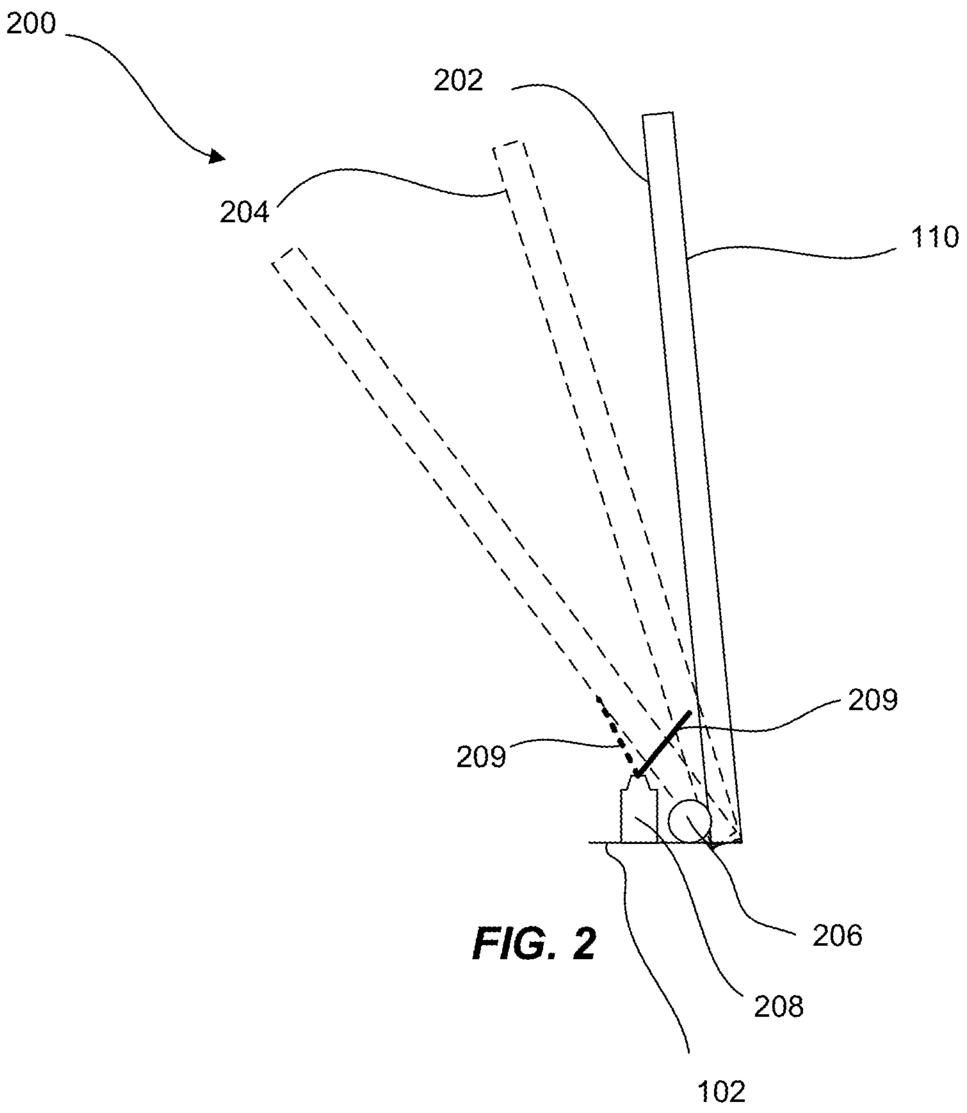
FIG. 2 shows a guardrail system.

Referring to FIG. 2, which illustrates an example elevator car guardrail system 200, each of the barriers 110, 110' is configured to be displaced from a first position 202 to a second position 204, 204', upon contact with an object, for example maintenance personnel 120 in the hoistway 104 as seen in FIG. 1. In other words, when a force is applied to the barrier 110, 110', the barrier 110, 110' is configured such that it moves from the first position 202 to the second position 204, 204'.

In the example shown, the barrier 110, 110' is configured to rotate between the first position 202 and one of the second positions 204, 204'. In this example, the axis of rotation 206 of the barrier is along a lower edge of the barrier 110, 110' between the elevator car 102 and the barrier 110, 110'.

The elevator car 102 further includes a switch 208, which is connectable in series with a safety chain circuit, as is described below with reference to FIG. 5.

The switch 208 is positioned relative to the barrier 110, 110' such that movement of the barrier 110, 110' from the first position 202 to one of the second positions 204, 204' opens the switch 208 and thereby initiates an emergency stop procedure of the elevator car 102. The switch 208 may aptly be positioned such that the angle of rotation of the barrier 110, 110' between the first position 202 and the second position 204, 204' (at which the switch 208 is opened) is at least 3 degrees, preferably at least 4 degrees, for example 5 to 10 degrees This means that the switch 208 is triggered quickly whenever the barrier 110, 110' contacts a ceiling and is pushed to rotate through this angle. The barrier 110, 110' may be able to continue rotating through an angle of up to 80 degrees, for example up to about 86 degrees, and even substantially up to 90 degrees (e.g. depending on the structure of the barrier 110, 110' and its ability to lie horizontally).

In this example, the switch 208 includes a pin contact 209 that is configured to move between an on (or closed) position (as indicated by the solid line) and an off (or open) position as indicated by the dotted line. The barrier 110, 110' is configured to apply a force to the pin contact 209 of the switch 208 to move the pin contact 209 from the closed position to the open position upon displacement of the barrier 110, 110' from the first position 202 to one of the second positions 204, 204'. Movement of the pin contact 209 to the open position breaks the safety chain circuit so that the elevator brake is therefore applied.

In some examples, the pin contact 209 may be a latching contact, such that the switch is latched open when moved to the open position. The switch 208 may then remain in the open position until the switch 208 is manually reset to the closed position. This may be advantageous in that the switch 208 cannot be accidentally reset, which may result in unintentional release of the elevator brake.

Returning to FIG. 1, the barrier 110 extending from the external upper surface 106 of the elevator car 102 includes a rigid portion 112 and a flexible portion 114. It can be seen that the barrier 110, 110' is configured to extend at least a predetermined distance from the elevator car 102. For the barrier 110 above the elevator car 102, the rigid portion 112 extends a designated height and the flexible portion 114 extends an additional distance that is selected to correspond to a stopping distance of the elevator car 102 during the emergency stop procedure. For example, the height of the flexible portion 114 may be greater than the stopping distance of the elevator car 102. In this way, the flexible portion 114 may provide a first point of contact e.g. with an elevator ceiling.

The barrier 110' below the elevator car 102 is configured to extend a predetermined distance from the elevator car 102 that includes an additional stopping distance. In this way, the barrier 110' may provide a first point of contact with an external object, such as the maintenance personnel 120 positioned in the hoistway pit. Upon contact with the maintenance personnel 120, the barrier 110' deflects and this opens the switch 208 (seen in FIG. 2) so that the emergency stop procedure is initiated. The barrier 110' may then continue to rotate beyond the second position 204' to a further second position 204' whilst the elevator car 102 decelerates to a stop. Since the height of the barrier 110' is greater than the minimum designated height for a safety space by including the stopping distance of the elevator car 102 as an additional distance, the elevator car 102 will stop before the elevator car 102 collides with the maintenance personnel 120, thereby avoiding serious injury to the maintenance personnel 120 and avoiding damage to the elevator car 102.

Figure 3:
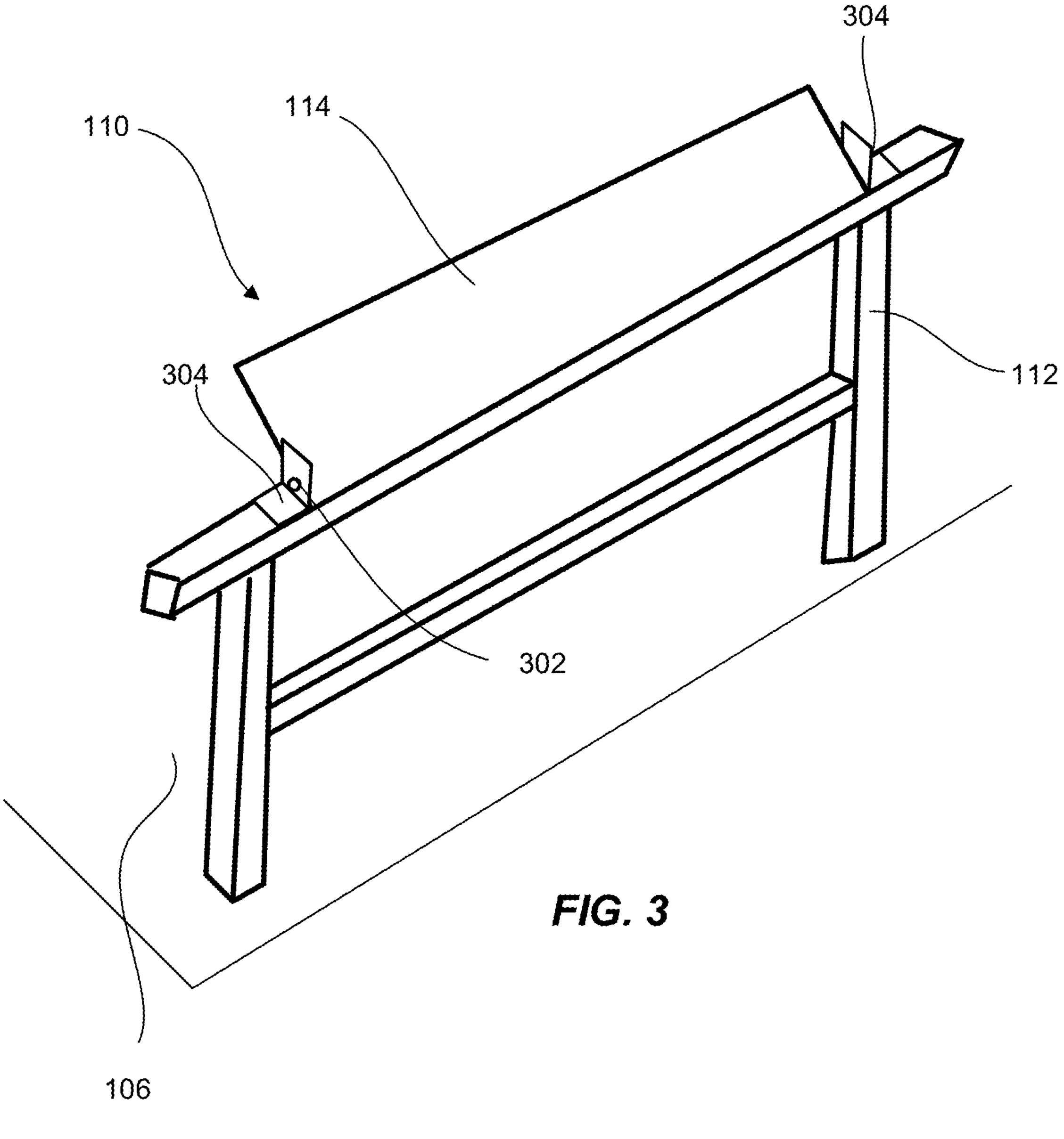
FIG. 3 illustrates another guardrail system.

As shown in further detail in FIG. 3, the rigid portion 112 extends upwardly from the external upper surface 106 of the elevator car 102. The rigid portion 112 may be substantially perpendicular with the surface of the elevator car 102. The rigid portion 112 may be configured to be of a suitable height to prevent accidental falling of maintenance personnel 120 from the elevator car 102 as well as providing a safety space. For example, the rigid portion 112 may be around 1 meter in height.

The flexible portion 114 extends from the rigid portion 112 and is configured to be displaced relative to the rigid portion 112. In this example, the flexible portion 114 is configured to rotate and flex relative to the rigid portion 112. The flexible portion 114 extends from an upper surface of the rigid portion 112. In this example, the flexible portion 114 is mounted on an axis 302, which is coupled to the rigid portion 112 via a pair of mounting brackets 304.

In the first position (i.e. a neutral position), the flexible portion 114 is configured to extend from the rigid portion 112 at an angle with respect to the rigid portion 112. In some examples, the flexible portion 114 may extend inwardly towards a central region of the elevator car 102. In this way, the flexible portion 114 provides a first point of contact with any maintenance personnel 120 who may be reaching or leaning beyond the perimeter of the elevator car 120. As such, the flexible portion 114 will rotate relative to the rigid portion 112 to the second position, thereby opening the switch 208 (in a similar manner to that described with reference to FIG. 2), and initiating the emergency stop procedure of the elevator car 102. It will be appreciated that the flexible portion 114 may also continue to rotate beyond the second position, if an appropriate force is applied.

As well as rotating upon contact with an object, the flexible portion 114 is configured to resiliently flex, which may help to further dampen any sudden impact forces. The flexible portion 114 may therefore flex and rotate beyond the second position. In other examples, rotational movement of the flexible portion 114 may be restricted to the region between the first and second position, and therefore the flexible portion 114 will only flex beyond the second position.

Figure 4:
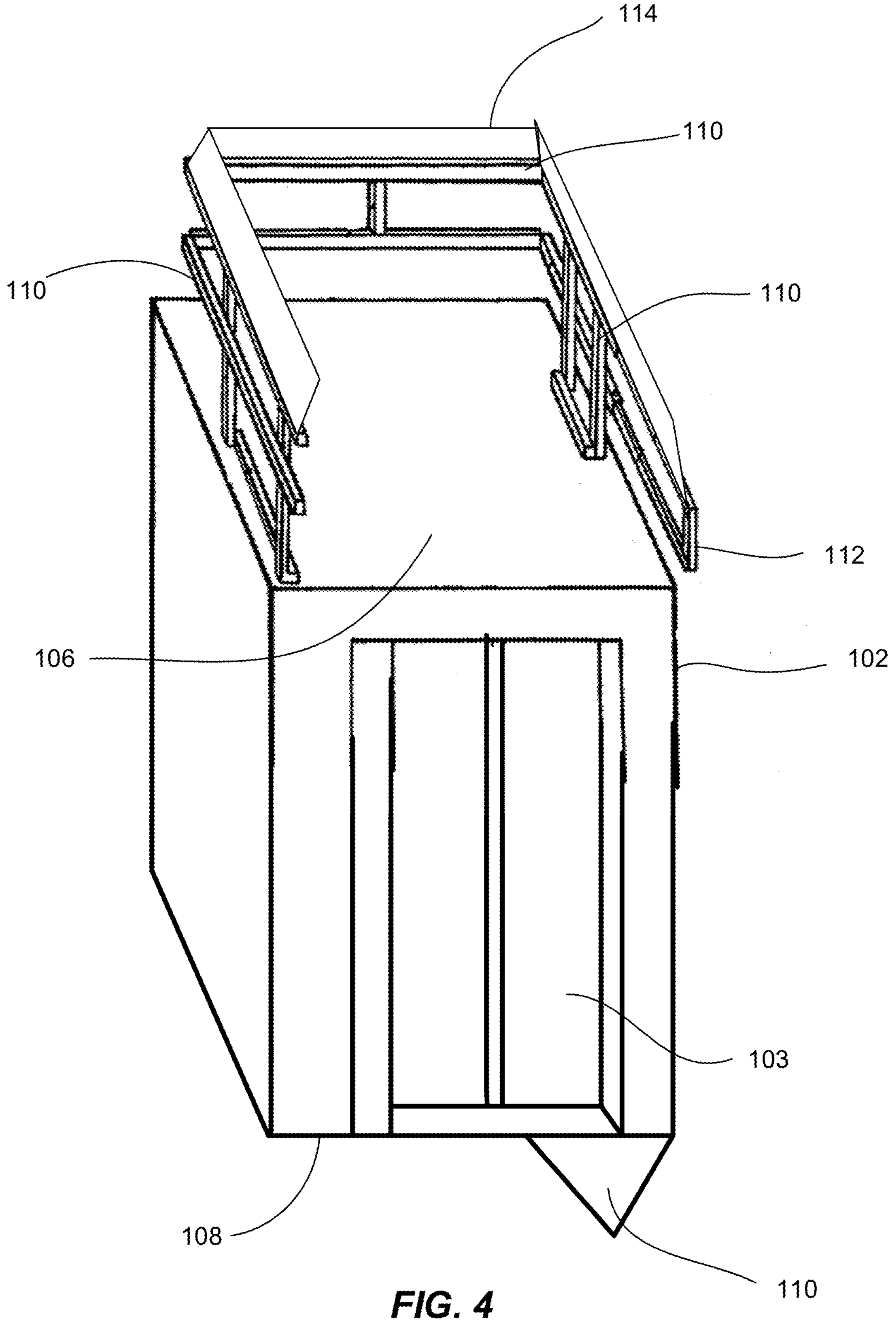
FIG. 4 shows a perspective view of an elevator car.

Referring now to FIG. 4, there is shown an example elevator car 102 including an external upper surface 106 and an external lower surface 108. The elevator car 102 also includes elevator car doors 103 through which elevator passengers may enter the elevator car 102.

In this example, the elevator car 102 includes a plurality of barriers 110 extending from the external upper surface 106 of the elevator car 102. Each of the barriers 110 extends along a perimeter edge of the external upper surface 106, leaving one perimeter edge open to allow access to the top of the elevator car 102 from a landing door in the elevator system 100. In this example, each of the barriers 110 extending from the external upper surface 106 are configured similarly to the barrier 110 shown in FIG. 3, and will not be described again in detail.

A further barrier 110', extends from the external lower surface 108 of the elevator car 102. In this example, the further barrier 110' is configured to rotate relative to the elevator car 102 upon impact with an object, for example maintenance personnel 120 in the hoistway 104 (as seen in FIG. 1). The axis of rotation is between the barrier 110' and the elevator car 102. The barrier 110' may be rigid and configured to only rotate relative to the elevator car 102. In other examples, the barrier 110' may be flexible and may be configured to flex and rotate relative to the elevator car 102. The barrier 110' is configured to rotate between a first position and a second position to open the switch 208 and initiate the emergency stop procedure of the elevator car 102, in a similar manner to the other examples described herein.

In this example, the further barrier 110' is positioned along one perimeter edge of the external lower surface 108 of the elevator car 102 in a region which is most likely to impact maintenance personnel 120. In other examples, the further barrier 110' may be positioned along a different perimeter edge of the external lower surface 108 of the elevator car 102, or a plurality of further barriers 110' may extend from the external lower surface 108 of the elevator car 102. The further barriers 110' may be positioned to extend from any lower portion of the elevator car 102 most likely to strike maintenance personnel 120 carrying out maintenance work in the hoistway 104 (as seen in FIG. 1).

Figure 5:
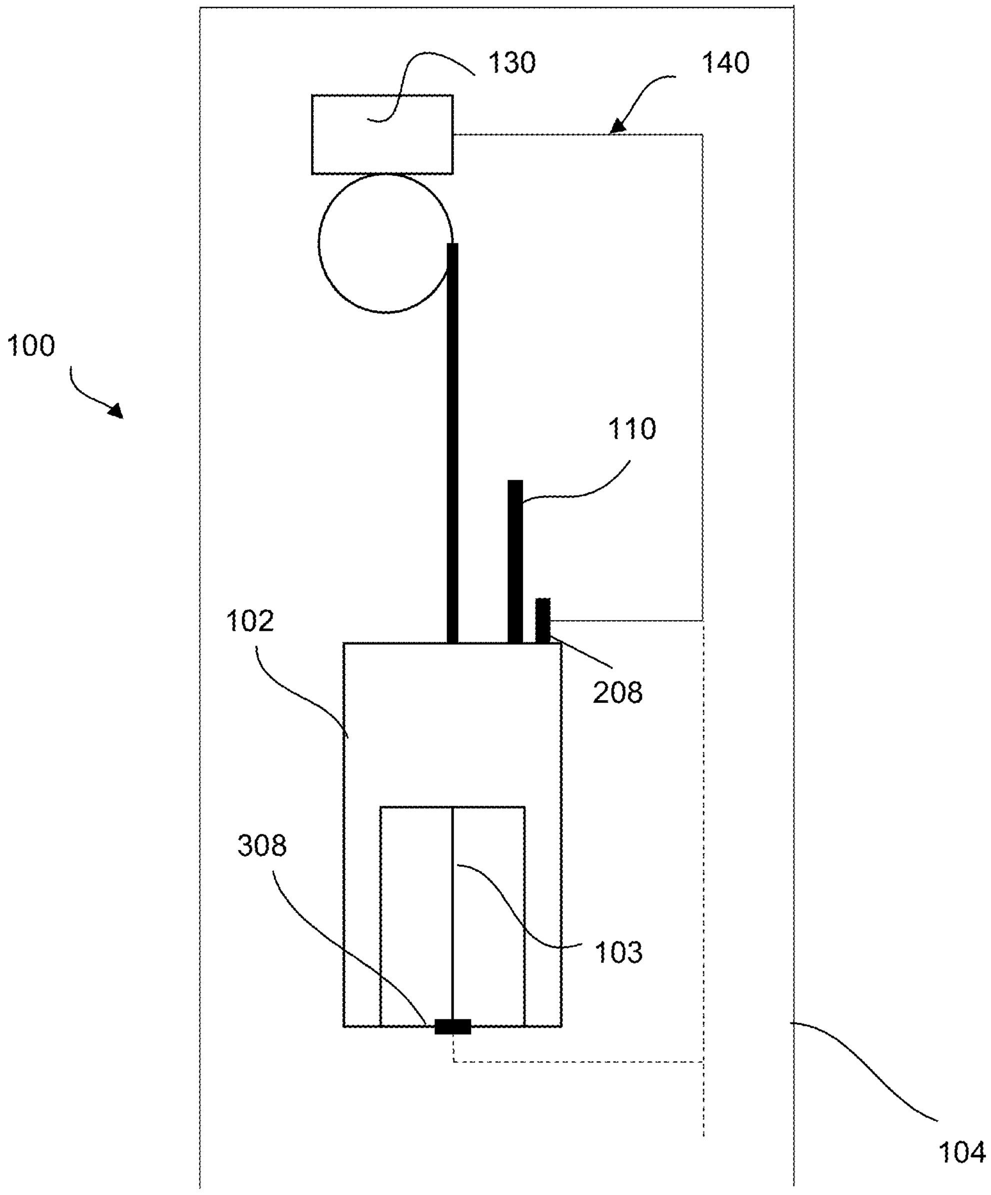
FIG. 5 is a schematic side view of the elevator system including a safety system.

FIG. 5 illustrates an elevator system 100 comprising an elevator car 102 travelling in a hoistway 104. The elevator system 100 includes a safety system comprising an elevator brake 130 and a safety chain circuit 140. As is known in the art, the safety chain circuit 140 may include a number of different switches connected in series so as to monitor proper functioning of various components in the elevator system 100. For example, it is shown in FIG. 5 that the safety chain circuit 140 includes a switch 308 monitoring the elevator car doors. The switch 308 is open whenever the elevator car doors 103 are open, which breaks the safety chain circuit 140 and ensures the elevator brake 130 is not released. At least one barrier 110 extends from an external surface of the elevator car 102 in the manner described above. A switch 208 is connected in series with the safety chain circuit 140, such that displacement of the barrier 110 opens the switch 208 and breaks the safety chain circuit 140, which causes the elevator brake 130 to be applied, thereby initiating an emergency stop procedure of the elevator car 102.

As in the example seen in FIG. 2, the switch 208 includes a pin contact 209 that is configured to move between an on (or closed) position (as indicated by the solid line) and an off (or open) position as indicated by the dotted line. In the open position, the safety chain circuit 140 is broken. The elevator brake is typically an electromagnetic brake, which is held open under application of an applied voltage, but is resiliently biased to the closed (or braking) position. As such, when the applied voltage is removed by breaking the safety chain circuit 140, the elevator brake returns to the braking position and the emergency brake procedure is initiated.

It will be appreciated that various modifications may be made to the examples described herein. For example, although the barriers described above are positioned to extend from the upper or lower surface of the elevator car, in other examples, the barrier may extend from one or more side surfaces of the elevator car. In such an example, the barrier may extend from the side surface of the elevator car in such a way that it will provide a first point of contact with an object in the hoistway.

Although in the examples above, the barrier moves from the first position to the second position by rotational movement, it will be appreciated that other types of displacement may be possible. For example, where the barrier is a flexible barrier, the barrier may only flex to thereby apply a force to open the switch. In further examples, the barrier may be configured to slide relative to the elevator car, for example up or down, in order to open the switch.

It will be appreciated by those skilled in the art that the disclosure has been illustrated by describing one or more examples thereof, but is not limited to these examples; many variations and modifications are possible, within the scope of the accompanying claims.

What is claimed is:

1. An elevator car (102) comprising:

at least one barrier (110, 110') extending from an external surface (106, 108) of the elevator car (102); and a switch (208) connectable in series with a safety chain circuit (140);

wherein the at least one barrier (110, 110') is configured to be displaced from a first position (202) to a second position (204, 204') upon contact with an object (120), such that the displacement to the second position (204, 204') opens the switch (208) to initiate an emergency stop procedure of the elevator car (102);

wherein the at least one barrier (110, 110') is configured to extend a predetermined distance from the external surface (106, 108) of the elevator car (102), and wherein the predetermined distance includes a designated height of a safety space and an additional height which corresponds to a stopping distance of the elevator car during the emergency stop procedure.

2. The elevator car (102) according to claim 1, wherein the at least one barrier (110, 110') comprises a flexible portion (114) configured to flex upon contact with an object (120).

3. The elevator car (102) according to claim 2, wherein the at least one barrier (110, 110') further comprises a rigid portion (112) extending substantially perpendicular from the external surface (106) of the elevator car, and wherein the flexible portion (114) extends from the rigid portion (112) and is configured to be displaced relative to the rigid portion (112).

4. The elevator car (102) according to claim 3, wherein the flexible portion (114) is configured to flex and/or rotate relative to the rigid portion (112) to thereby move to the second position (204) upon contact with an object (120).

5. The elevator car (102) according to claim 3, wherein the flexible portion (114) is configured to extend from the rigid portion (112) by an additional distance corresponding to a stopping distance of the elevator car (102) during the emergency stop procedure.

6. The elevator car (102) according to claim 1, wherein at least a portion of the at least one barrier (110, 110') is configured to rotate between the first position (202) and the second position (204, 204').

7. The elevator car (102) according to claim 6, wherein an angle of rotation between the first position (202) and the second position (204, 204') is at least 3 degrees.

8. The elevator car (102) according to claim 6, wherein said at least a portion of the at least one barrier (110, 110') is configured to rotate beyond the second position (204, 204').

9. The elevator car (102) according to claim 6, wherein said at least a portion of the at least one barrier (110, 110') is a flexible portion (114) configured to flex under an applied force after rotating to the second position (204).

10. The elevator car (102) according to claim 6, wherein an axis of rotation (302) of said at least a portion of the at least one barrier (110, 110') is between the at least one barrier (110, 110') and the external surface (108) of the elevator car (102).

11. The elevator car (102) according to claim 1, wherein the at least one barrier (110, 110') comprises a barrier (110') extending from an external lower surface (108) of the elevator car (102).

12. The elevator car (102) according to claim 11, wherein the barrier (110') extending from the external lower surface (108) of the elevator car (102) is flexible and is configured to flex and/or rotate between the first position (202) and the second position (204, 204') upon contact with an object (120) to thereby open the switch (208).

13. The elevator car (102) according to claim 1, wherein the at least one barrier (110, 110') comprises a barrier (110) extending from an external upper surface (106) of the elevator car (102).

14. The elevator car (102) according to claim 1, wherein the switch (208) comprises a latching contact (209) configured to latch open and maintain the open position when the at least one barrier (110, 110') is displaced to the second position (204, 204').

* * * * *